United States Patent Office

3,450,659
Patented June 17, 1969

3,450,659
PROCESS FOR THE PREPARATION OF UREA-FORMALDEHYDE CONCENTRATED SOLUTIONS HAVING A HIGH CONTENT OF METHYLENIC LINKAGES
Enrico Bondi, Milan, and Armando Larcher, Varese, Italy, assignors to Montecatini Edison S.p.A., Milan, Italy
No Drawing. Filed July 26, 1966, Ser. No. 567,850
Claims priority, application Italy, Aug. 2, 1965, 17,463/65
Int. Cl. C08g 9/10, 37/28
U.S. Cl. 260—29.4      8 Claims

ABSTRACT OF THE DISCLOSURE

Described is a process for the preparation of aqueous, stable and concentrated solutions of urea, formaldehyde and reaction products thereof, containing at least 12% methylenic linkages and having a global molar ratio between urea and formaldehyde comprised between 1:4 and 1:10. The process comprises treating such solutions obtained in alkaline phase, with acid at a tempertaure comprised between room temperature and 100° C. and at a pH between 1.5 and 3, for at least 20 minutes to alter the number of methylenic linkages and then bringing the pH again to neutrality. The product is also described.

---

The present invention is concerned with a process for preparing aqueous, concentrated, stable solutions of formaldehyde, urea and reaction products thereof, having a high content of methylenic linkages and a global molar ratio between urea and formaldehyde comprised between 1:4 and 1:10.

The present invention is moreover concerned with particular aqueous, concentrated and stable solutions having new characteristics.

"Globar molar ratio" is the molar ratio of free and chemically bound urea to free and chemically bound formaldehyde. As known, the expression "aqueous stable solutions" means mixtures of water, urea, formaldehyde and reaction products thereof which, under the usual storage conditions, do not become turbid.

These solutions are conventionally employed in the preparation of glues, molding masses, impregnating resins, etc. Many processes are known in the art for preparing aqueous, concentrated solutions of urea and formaldehyde. For instance, some known processes involve the reaction of urea and formaldehyde in solution and subsequently, concentrating the obtained product; others provide for the absorption of formaldehyde gases, directly coming from synthesis plants, by urea or its solutions. These processes may be carried out either in alkaline or in acid phase.

As is known, the processes, particularly continuous processes, can more easily be carried out in alkaline phase than in acid phase. Solutions having a high content of methylene linkages, however, can only be obtained by operating in acid phase.

For instance, urea-formaldehyde condensates, containing methylenic linkages, may be obtained from formaldehyde containing gases through continuous absorption, in neutral to acid phase, by urea-formaldehyde pre-condensates which in their turn are obtained in acid phase (German Patent 1,168,882). This type of process, however, cannot be easily utilized because of the practical difficulties encountered in the absorption, in acid phase, of formaldehyde with solutions of urea-formaldehyde pre-condensates, particularly when the formaldehyde-urea ratios are still low. Moreover, as the formaldehyde-urea ratios become higher, operation in a weakly acid environment (final acid pH values due to formic acid in excess of 4.5 are obtained) constitutes a further source of instability.

It is an object of the present invention to provide a new, simple and reliable method of preparing aqueous, concentrated, stable solutions of urea, formaldehyde and reaction products thereof, having a high content of methylenic linkages. This object is attained by submitting aqueous, concentrated solutions of urea, formaldehyde and reaction products thereof, having a global molar ratio between urea and formaldehyde between 1:4 and 1:10 and obtained by operating in alkaline phase, with methods known per se, to an acid treatment at a temperature between room temperature and 100° C., preferably above 50° C. and at a pH not greater than 4, and subsequently returning the pH to neutral values. We have surprisingly found that if one operates at strongly acid pH values, preferably comprised between 1.5 and 3, products are obtained having new characteristics which allow to attain considerable advantages during their practical use. The solutions which are thus obtained, at equal content of total urea+total formaldehyde and at equal urea-formaldehyde molar ratio, have a much lower viscosity and a greater dilutability (measured as volumes of anhydrous dioxane per volume of solution at 20° C.) and a much lower refractive index than concentrated solutions obtained according to the known techniques.

In particular, solutions having a formaldehyde urea ratio between 4.5 and 5.5 have, when the sum of the urea+formaldehyde content is 80% and the pH is about neutral, the following characteristics:

Viscosity _____ cps__ 50–80
Dilutability _____ 5.5–7.5
$n_d^{20}$ _____ 1.4550–1.4575
Methylenic linkages _____ percent__ 20–24

Solutions having the same composition and obtained from products prepared, respectively, in alkaline and acid phase, according to the known art, have the following characteristics:

|  | Product prepared in alkaline phase | Product prepared in acid phase |
|---|---|---|
| Viscosity (cps.) | 140–180 | 300–500 |
| Dilutability | 2.5–3.5 | 1.5–2 |
| $n_d^{20}$ | 1.4635 | 1.4612 |
| Methylenic linkages, percent | ≥1 | 10–15 |

When said solutions are used for producing glues, of the type commonly employed, the glues show, in addition to a high adhesion power, an extraordinarily low formaldehyde development, polarographically determined (never in excess of 0.5%).

Within the aforementioned pH and temperature ranges it is possible to obtain by stopping the reaction at the desired point, based for instance on the dilutability, viscosity or refraction index determinations, the new products or products which are intermediate the new products and the starting products.

The products commonly obtained in acid phase are between said intermediate products. They constitute an isolatable intermediate stage of the transformation into the new products, of the products obtained in alkaline phase. At pH values in excess of 3, the starting product is not converted into the new products in any appreciable yields.

Many different acids may be used, e.g. sulphuric, hydrochloric, phosphoric acid etc. The particular acid is not critical. The only essential thing is reaching a certain pH value in the treatment of the product obtained in alkaline phase and carrying out the acidification in sufficiently concentrated solution. At the end of the treatment, the solution is neutralized by employing sodium or calcium carbonate, for instance to a neutral pH.

The use of sulphuric acid or any other strong acid capable of giving insoluble salts with the alkaline or alkaline-earth metals, permits easy separation of the formed salt from the product by filtration. This constitutes a further advantage, since as known, the presence of salts in the condensates deleteritously influences the properties of the resins.

The urea-formaldehyde solutions prepared in alkaline phase, and used as the starting material in the present process, may have a total of urea and formaldehyde ranging from 60 to 90%, preferably from 70 to 85%, and a global molar ratio between urea and formaldehyde comprised between 4 and 10, preferably between 4 and 6. Starting products suitable for utilization in the present process, such as those described in U.S. Patent 3,067,177, are obtained by a continuous countercurrent absorption of formaldehyde containing gases in urea solutions in alkaline phase. Concentrated solutions prepared in alkaline phase with any other known method, either with continuous or discontinuous processes, however, may also be used.

The acidification of these concentrates may be carried out either batchwise or continuously. In the latter case, and this constitutes a particular advantageous feature of the process according to the present invention, it is possible to carry out in a single plant completely continuous, both the preparation of the concentrates in alkaline phase and the subsequent acidification. Thus one simultaneously produces alkaline concentrates and concentrates having a high content of methylenic linkages, which are obtained from the former by means of acidification. This can very easily be carried out in the plants such as those described in the above-mentioned U.S. patent. To this purpose, it is sufficient to lead a portion of the concentrated solution, leaving the absorption plant described in the above-mentioned patent as end product, to a vessel wherein said portion is continuously mixed with an acid, while keeping it at the desired pH and temperature.

The neutralization may be continuously carried out in a second vessel and the neutralized product is subsequently filtered on a continuous filter. In this manner, one can contemporaneously obtain from the plant two products having different characteristics in any relative proportion. All these products, although having different structural characteristics may be employed, as stated above, in the preparation of molding masses, glues, impregnating resins, etc.

The following examples illustrate the present invention without limiting the scope thereof.

Example 1

A concentrated urea-formaldehyde solution prepared in alkaline phase and having the following characteristics:

Formaldehyde/urea molar ratio _____ 5.0
Sum of total formaldehyde+total urea
      percent by weight__ 80
Ashes _____do____ 0.08
pH _____ 7.2
Methylenic formaldehyde/total formaldehyde
      percent__ ≤1
Viscosity _____cps__ 159
$n_d^{20}$ _____ 1.4635
Dilutability (volumes of dioxane necessary to form turbidity in a volume of concentrated solution at 20° C.) _____ 3.2 was heated to 90° C. and then acidified by sulphuric acid to pH 1.9. The reaction mass was kept under these conditions during 120 minutes, cooled down to room temperature, thereafter calcium carbonate powder was added until neutralization and the excess was filtered off. The product obtained was limpid with the following characteristics:

Ash _____percent by weight__ 0.08
pH _____ 7.2
Methylenic formaldehyde/total formaldehyde
      percent__ 20
Viscosity (20° C.) _____cps__ 67
$n_d^{20}$ _____ 1.4563
Dilutability (as above defined) _____ 6.3

The product can be stored for at least 6 months without appreciable variations of viscosity and appearance.

It was used for the preparation of a wood adhesive as follows: Urea was added to the solution until a formaldehyde-urea ratio of 2 is obtained. The mass was then heated to 83° C. and acidified at this temperature up to a pH of 5.6–5.7. The whole was condensed at 90° C. until a viscosity of 1200–1300 cps. (at 20° C.) was obtained. The resin thus prepared was neutralized (pH 7.5–8.0). The mass was cooled and the adhesive was ready for use. The formaldehyde developed by the adhesive during hardening was then polarographically determined and a loss of 0.4% was found, based on the weight of dry adhesive.

A similar run was carried out with an adhesive prepared under the same conditions but using the solution of urea-formaldehyde condensate starting material of the present invention. The formaldehyde loss was 3.4%. Similar results were obtained when employing an urea-formaldehyde condensate prepared in acid phase according to German Patent 1,168,882.

The total formaldhyde content was determined by acid hydrolysis according to the method reported by P. R. Averell in "Analytical Chemistry of Polymers, vol. XII, High Polymers series, Interscience Publ. Co., page 96." The methylenic formaldehyde was determined subtracting from the total formaldehyde, the methylolic formaldehyde oxydimetrically determined according to Blanck and Finkenbeiner "Berichte vol. 31, pages 2979–81 (1898)." It is possible to draw a relationship between the loss of formaldehyde from the adhesive during its use and the amount of formaldehyde developed from the adhesive during hardening, polarographically determined. For this reason, the latter value will be given in the examples as a measure of the amount of formaldehyde developed by the adhesive during use.

Example 2

The concentrated urea-formaldehyde solution prepared in alkaline phase and described in Example 1 was heated to 90° C. and then brought to pH 3.5 with sulphuric acid. The solution was kept under these conditions for 20 minutes. It was neutralized with powdered calcium carbonate and filtered. A limpid product was obtained having the following characteristics:

Ash _____percent by weight__ 0.08
pH _____ 7.2
Methylenic formaldehyde/total formaldehyde
      percent__ 12
Viscosity at 20° C. _____cps__ 398
$n_d^{20}$ _____ 1.4612
Dilutability _____ 2.0

The product can be stored for at least 6 months without appreciable variations of viscosity and appearance. The loss of formaldehyde from the adhesive obtained starting from this product, prepared according to Example 1, is about 3.4%.

Example 3

A concentrated urea-formaldehyde solution prepared in alkaline phase and having the following characteristics:

| | |
|---|---|
| Formaldehyde/urea molar ratio | 5.0 |
| Sum of total formaldehyde+total urea _____ percent by weight__ | 80 |
| Ash _____do____ | 0.08 |
| pH | 7.2 |
| Methylenic formaldehyde/total formaldehyde _____ percent__ | 1 |
| Viscosity (20° C.) _____cps__ | 159 |
| $n_d^{20}$ | 1.4635 |
| Dilutability | 3.2 | was heated to 90° C. and then brought by hydrochloric acid to pH 1.9. The reaction mass was kept under these conditions for 120 minutes, then cooled and finely powdered calcium carbonate was added until neutralization with the excess filtered off. The product obtained was limpid and has the following characteristics:

| | |
|---|---|
| Ash _____ percent by weight__ | 0.3 |
| pH | 7.2 |
| Methylenic formaldehyde/total formaldehyde _____ percent__ | 20 |
| Viscosity (20° C.) _____cps__ | 67 |
| $n_d^{20}$ | 1.4565 |
| Dilutability | 6.3 |

The product can be stored for at least 6 months without appreciable variations of viscosity and appearance. It was used for the preparation of a wood adhesive as follows: Urea was added to the solution until a formaldehyde-urea ratio of 2 is obtained. The mass was then heated to 83° C. and acidified at this temperature to a pH of 5.6–5.7. The whole was condensed at 90° C. until a viscosity of 1200–1300 cps. (at 20° C.) was obtained. The resin thus prepared was neutralized (pH 7.5–8.0). The mass was cooled and the adhesive was ready for use. The formaldehyde developed by the adhesive during hardening was then polarographically determined and a loss of 0.4% was found, based on the weight of dry adhesive.

We claim:

1. Process for the preparation of aqueous, stable and concentrated solutions of urea, formaldehyde and reaction products thereof, containing at least 12% methylenic linkages and having a global molar ratio between urea and formaldehyde comprised between 1:4 and 1:10, which comprises treating such solutions obtained in alkaline phase, with acid at a temperature comprised between room temperature and 100° C. and at a pH between 1.5 and 3, for at least 20 minutes to alter the number of methylenic linkages and then bringing the pH again to neutrality.

2. The process according to claim 1, wherein the temperature is between 50 and 100° C.

3. The process according to claim 1, wherein the neutralization is carried out by a basic substance which produces insoluble salts with the acids employed in the acidification stage.

4. The process according to claim 1, wherein sulfuric acid is used for acidification.

5. The process of claim 4, wherein calcium carbonate is used for the neutralization.

6. The process of claim 3, wherein the acid treatment is continuously carried out on at least a portion of the concentrated solutions obtained by continuously countercurrently absorbing in alkaline phase, formaldehyde and water in urea and solutions thereof.

7. The process of claim 6, wherein the neutralization and filtration are continuously carried out.

8. A stable concentrated solution of urea formaldehyde and their reaction products having a global formaldehyde urea molar ratio comprised between 4.5 and 5.5, a methylenic linkage content comprised between 20 and 24% of the total formaldehyde and, when the sum of the total urea+total formaldehyde is of 80% by weight, and their pH is about neutral, they have a viscosity comprised between 50 and 80 cps., a dilutability in dioxane comprised between 5.5 and 7.5, a refraction index comprised between 1.4550 and 1.4575.

References Cited

UNITED STATES PATENTS

| | | | |
|---|---|---|---|
| Re. 23,174 | 11/1949 | Kvalnes | 260—69 |
| 2,554,424 | 5/1951 | Suen | 260—29.4 |
| 2,625,524 | 1/1953 | Kvalnes | 260—29.4 |
| 2,947,750 | 8/1960 | Gerg | 260—70 |
| 3,198,761 | 8/1965 | O'Donnell | 260—29.4 |

MURRAY TILLMAN, *Primary Examiner.*

J. C. BLEUTGE, *Assistant Examiner.*

U.S. Cl. X.R.

156—331; 161—261; 260—69, 70, 71